United States Patent
Hsu et al.

(10) Patent No.: US 11,596,024 B2
(45) Date of Patent: Feb. 28, 2023

(54) PHYSICAL PROTOCOL DATA UNIT TRANSMISSION METHOD EMPLOYED BY WIRELESS FIDELITY MULTI-LINK DEVICE

(71) Applicant: MEDIATEK INC., Hsin-Chu (TW)

(72) Inventors: Chien-Fang Hsu, Hsinchu (TW); Yongho Seok, San Jose, CA (US); James Chih-Shi Yee, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 17 days.

(21) Appl. No.: 17/027,735

(22) Filed: Sep. 22, 2020

(65) Prior Publication Data

US 2021/0105859 A1    Apr. 8, 2021

Related U.S. Application Data

(60) Provisional application No. 62/909,831, filed on Oct. 3, 2019.

(51) Int. Cl.
| | |
|---|---|
| H04W 80/02 | (2009.01) |
| H04W 28/06 | (2009.01) |
| H04L 69/324 | (2022.01) |
| H04W 28/08 | (2023.01) |

(52) U.S. Cl.
CPC .......... *H04W 80/02* (2013.01); *H04L 69/324* (2013.01); *H04W 28/06* (2013.01); *H04W 28/085* (2013.01)

(58) Field of Classification Search
None
See application file for complete search history.

(56) References Cited

U.S. PATENT DOCUMENTS

| | | | | |
|---|---|---|---|---|
| 2013/0208606 A1* | 8/2013 | Merlin | .................. | H04L 1/0025 370/252 |
| 2014/0293916 A1* | 10/2014 | Sohn | .................... | H04W 72/04 370/329 |
| 2016/0269932 A1* | 9/2016 | Nemavat | .......... | H04W 28/0231 |
| 2017/0099219 A1* | 4/2017 | Lee | ........................ | H04W 28/02 |
| 2017/0264550 A1* | 9/2017 | Larose | ............... | H04L 67/1029 |
| 2018/0234320 A1* | 8/2018 | Paulraj | ..................... | H04L 47/26 |
| 2019/0215884 A1* | 7/2019 | Patil | ...................... | H04W 76/15 |
| 2020/0036478 A1* | 1/2020 | Chu | ......................... | H04L 1/0057 |
| 2020/0037324 A1* | 1/2020 | Chu | ......................... | H04L 5/0044 |
| 2020/0162963 A1* | 5/2020 | Alpert | ................... | H04W 28/06 |
| 2020/0288523 A1* | 9/2020 | Patil | ...................... | H04W 80/02 |
| 2020/0359259 A1* | 11/2020 | Patil | ...................... | H04W 76/15 |
| 2021/0014784 A1* | 1/2021 | Kneckt | ............. | H04W 52/0209 |
| 2021/0014811 A1* | 1/2021 | Seok | ..................... | H04W 76/15 |
| 2021/0050999 A1* | 2/2021 | Huang | .................. | H04L 9/3242 |
| 2021/0076340 A1* | 3/2021 | Naribole | .............. | H04L 5/0055 |
| 2021/0084711 A1* | 3/2021 | Park | ................... | H04W 74/0816 |
| 2021/0307064 A1* | 9/2021 | Ryu | ...................... | H04W 24/10 |

(Continued)

*Primary Examiner* — Khaled M Kassim
*Assistant Examiner* — Berhanu D Belete
(74) *Attorney, Agent, or Firm* — Winston Hsu

(57) ABSTRACT

A physical protocol data unit (PPDU) transmission method includes aligning parameters of a plurality of links for constraining the plurality of links to have same capacity for PPDU transmission, and transmitting PPDUs via the plurality of links. Highest capacity supported by one of the plurality of links is different from highest capacity supported by another of the plurality of links. Each of the PPDUs is generated and transmitted under the same parameters. Ending time instants of transmission of the PPDUs are aligned.

12 Claims, 7 Drawing Sheets

(56) References Cited

U.S. PATENT DOCUMENTS

2021/0329698 A1* 10/2021 Jang .................. H04W 72/0446
2021/0336827 A1* 10/2021 Park ...................... H04L 1/0069
2021/0409958 A1* 12/2021 Huang ................ H04L 25/0224

* cited by examiner

PHYSICAL PROTOCOL DATA UNIT TRANSMISSION METHOD EMPLOYED BY WIRELESS FIDELITY MULTI-LINK DEVICE

CROSS REFERENCE TO RELATED APPLICATIONS

This application claims the benefit of U.S. provisional application No. 62/909,831, filed on Oct. 3, 2019 and incorporated herein by reference.

BACKGROUND

The present invention relates to wireless communications, and more particularly, to a physical protocol data unit (PPDU) transmission method employed by a wireless fidelity (WiFi) multi-link device (MLD).

In a WiFi multi-link operation (MLO), there exist several links between two MLDs, including one access point (AP) and one non-AP station (STA), that occupy different radio-frequency (RF) bands. These links can operate independently to increase the overall throughput and/or to improve the connection stability. Regarding a synchronous mode of MLO, an MLD may synchronize its transmit (TX) timing and/or receive (RX) timing of multiple links. However, each link has its own capacity that is based on several parameters, including bandwidth (BW), number of spatial streams (NSS), modulation and coding mechanism (MCS), etc. Capacities of links can be very different. Hence, for the same upper layer content to be transmitted over these links, physical protocol data unit (PPDU) lengths may be very different, thus resulting in PPDU ending time misalignment.

The PPDU ending time misalignment may occur in some scenarios. In a first scenario, duplicate transmission is performed over a high capacity link and a low capacity link. Due to link capacity difference, the same contents transmitted over different links result in very different PPDU lengths. In a second scenario, a low capacity link's PPDU goes first and a high capacity link's PPDU goes later. Due to link capacity difference and transmission timing difference, the data left on the high capacity link is not enough to fulfill the PPDU length requirement to be synchronized with the low capacity link's PPDU. In a third scenario, the PPDU takes 80% of data on the first link, and the 20% rest data transmitted later on the second link results in a much shorter PPDU due to the fact that uncertain second link transmission makes the transmitter to load more data to the early coming transmission opportunity.

Thus, there is a need for an innovative PPDU transmission design which can deal with any of the above-mentioned scenarios to help a WiFi MLD to achieve PPDU ending time alignment of multiple links.

SUMMARY

One of the objectives of the claimed invention is to provide a physical protocol data unit (PPDU) transmission method employed by a wireless fidelity (WiFi) multi-link device (MLD). For example, the proposed PPDU transmission method can achieve PPDU ending time alignment of multiple links under any of the above-mentioned scenarios.

According to a first aspect of the present invention, an exemplary physical protocol data unit (PPDU) transmission method is disclosed. The exemplary PPDU transmission method includes: aligning, by a wireless fidelity (WiFi) multi-link device (MLD), parameters of a plurality of links for constraining the plurality of links to have same capacity for PPDU transmission, wherein highest capacity supported by one of the plurality of links is different from highest capacity supported by another of the plurality of links; and transmitting PPDUs via the plurality of links, wherein each of the PPDUs is generated and transmitted under the same parameters, and ending time instants of transmission of the PPDUs are aligned According to a second aspect of the present invention, an exemplary physical protocol data unit (PPDU) transmission method is disclosed. The exemplary PPDU transmission method includes: setting parameters of each of a plurality of links for enabling the plurality of links to have different capacity for PPDU transmission, wherein parameters of one of the plurality of links are different from parameters of another of the plurality of links, and highest capacity supported by said one of the plurality of links is higher than highest capacity supported by said another of the plurality of links; setting, by a wireless fidelity (WiFi) multi-link device (MLD), a content carried by a first PPDU transmitted via said one of the plurality of links to ensure that an ending time instant of transmission of the first PPDU transmitted via said one of the plurality of links and an ending time instant of transmission of a second PPDU transmitted via said another of the plurality of links are aligned; and transmitting PPDUs via the plurality of links, wherein one PPDU is transmitted via each of the plurality of links, and the PPDUs comprise the first PPDU and the second PPDU.

According to a third aspect of the present invention, an exemplary physical protocol data unit (PPDU) transmission method is disclosed. The exemplary PPDU transmission method includes: setting parameters of each of a plurality of links for enabling the plurality of links to have different capacity for PPDU transmission, wherein parameters of one of the plurality of links are different from parameters of another of the plurality of links, and highest capacity supported by said one of the plurality of links is higher than highest capacity supported by said another of the plurality of links; and transmitting, by a wireless fidelity (WiFi) multi-link device (MLD), PPDUs via the plurality of links, wherein one PPDU is transmitted via said another of the plurality of links, and multiple PPDUs are transmitted via said one of the plurality of links to ensure that an ending time instant of transmission of said one PPDU and an ending time instant of transmission of the multiple PPDUs are aligned.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
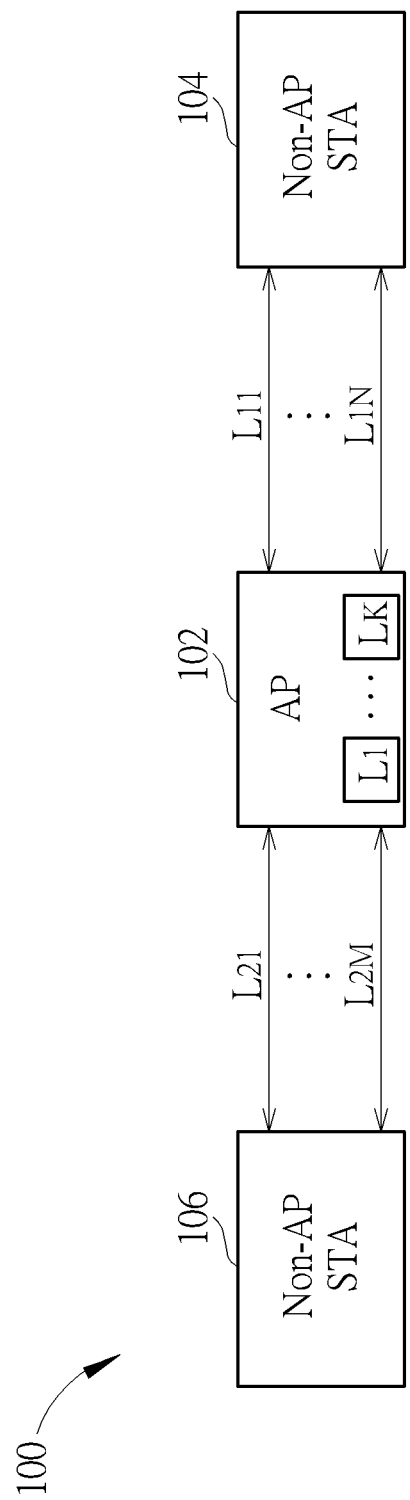
FIG. 1 is a diagram illustrating a wireless fidelity (WiFi) system according to an embodiment of the present invention.

FIG. 1 is a diagram illustrating a wireless fidelity (WiFi) system according to an embodiment of the present invention. For brevity and simplicity, it is assumed that the WiFi system 100 includes one access point (AP) 102 and two non-AP stations (STAs) 104 and 106. In this embodiment, AP 102 and non-AP STAs 104 and 106 are wireless fidelity (WiFi) multi-link devices (MLDs) that support multi-link operation (MLO). For example, AP 102 may own K links $L_1$-$L_K$ at different channels (radio frequency bands), may communicate with non-AP STA 104 via N links $L_{11}$-$L_{1N}$ (which are selected from links $L_1$-$L_K$), and may communicate with non-AP STA 106 via M links $L_{21}$-$L_{1M}$ (which are selected from links $L_1$-$L_K$), where K, M and N are positive integers, N is not smaller than 2, M is not smaller than 2, and K is not smaller than any of M and N. In some embodiments of the present invention, non-AP STAs 104 and 106 may be dual-radio STAs (M=N=2), and AP 102 may be a tri-band AP (K=3). For example, links owned by AP 102 may include a channel in 5 GHz, a channel in 6 GHz, and a channel in 2.4 GHz. However, this is for illustrative purposes only, and is not meant to be a limitation of the present invention. Any WiFi system using the proposed physical protocol data unit (PPDU) alignment mechanism falls within the scope of the present invention. In addition to MLO, the AP 102 may support other features such as multi-User multiple-input multiple-output (MU-MIMO) and orthogonal frequency-division multiple access (OFDMA) for multi-user transmission.

In certain cases, the PPDUs' starting time instants may not be synchronized due to the fact that transmission opportunity (TXOP) timing of multiple links may be different and/or the transmitter needs to check clear channel assessment (CCA) for a certain period before medium access. The proposed PPDU alignment mechanism is capable of synchronizing ending time instants of transmission of PPDUs transmitted over multiple links to help the acknowledgement (ACK) receiving and the follow-up transmission to be synchronized. In this present invention, ending time instants of transmission of PPDUs transmitted over multiple links may be regarded as aligned with each other when mismatch between the ending time instants falls within a predefined tolerance range. For example, the predefined tolerance range may be set by short interframe space (SIFS)±aSlot-Time*10%. In practice, the predefined tolerance range may be adjusted, depending upon actual design considerations.

Figure 2:
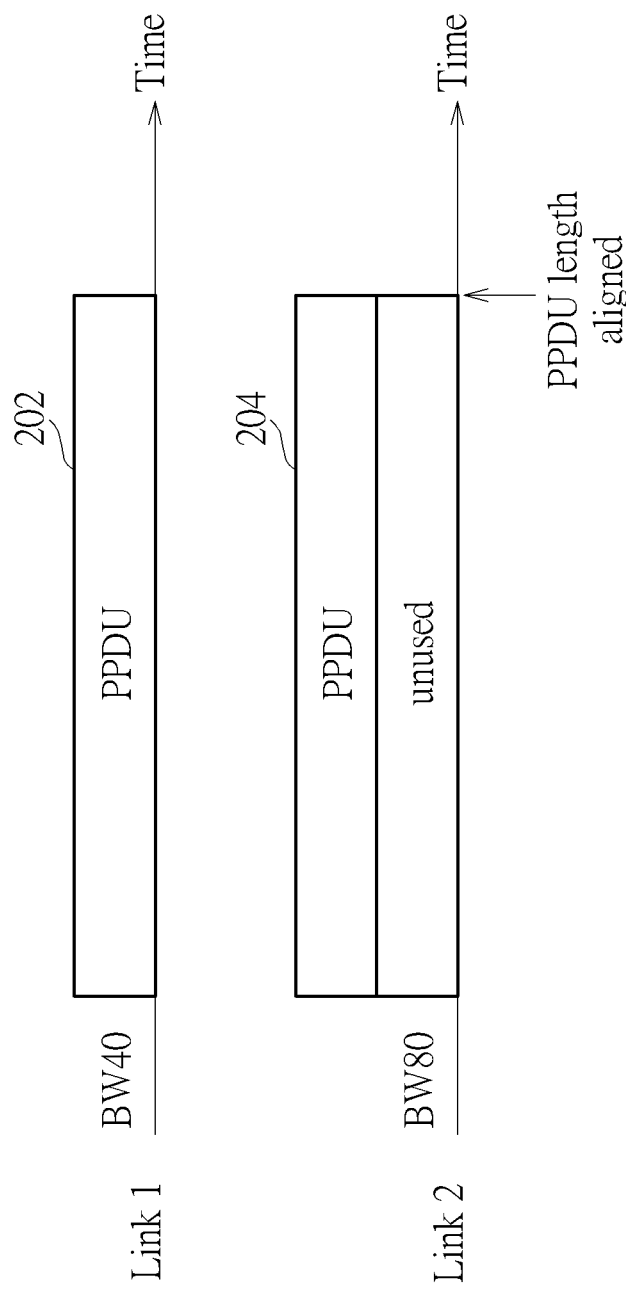
FIG. 2 is a diagram illustrating a first physical protocol data unit (PPDU) ending time alignment mechanism according to an embodiment of the present invention.

FIG. 2 is a diagram illustrating a first PPDU ending time alignment mechanism according to an embodiment of the present invention. In accordance with the first PPDU ending time alignment mechanism, one WiFi MLD (e.g., AP 102 shown in FIG. 1) aligns parameters of a plurality of links (e.g., links $L_{11}$-$L_{1N}$ or links $L_{21}$-$L_{1M}$) for constraining the links to have the same capacity for PPDU transmission, and transmits PPDUs via the links, where highest capacity supported by one of the links is different from highest capacity supported by another of the links, and each of the PPDUs is generated and transmitted under the same parameters. For example, the parameters may include BW, NSS, and MCS. In this embodiment, one WiFi MLD (e.g., AP 102) communicates with another WiFi MLD (e.g., Non-AP STA 104 or Non-AP STA 106) via a first link (denoted by "Link 1") and a second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link.

In accordance with the first PPDU ending time alignment mechanism, the PPDU transmission for each of the first link and the second link may use BW=40 MHz, NSS=1, and best MCS=MCS3. The first PPDU ending time alignment mechanism may be applicable to the duplicate transmission scenario with synchronized PPDU starting time. As shown in FIG. 2, one PPDU 202 is transmitted via the first link, and one PPDU 204 is transmitted via the second link, where the WiFi MLD (e.g., AP 102) transmits the PPDUs 202 and 204 to the same user (e.g., non-AP STA 104 or non-AP STA 106), and the PPDU 204 is a duplicate of the PPDU 202 such that the PPDUs 202 and 204 carry the same content. As shown in FIG. 2, the ending time instants of transmission of PPDUs 202 and 204 are aligned.

Since the highest capacity supported by the second link is higher than the highest capacity supported by the first link and parameters of the first link and the second link are constrained to be the same for PPDU transmission, the available capacity of the second link is not fully utilized by PPDU transmission. As a result, links capable of allowing more data transmission may lose efficiency. As shown in FIG. 2, a half of the capacity supported by the second link is unused during a transmission period of the PPDU 204. To address this issue, the present invention proposes a second PPDU ending time alignment mechanism.

Figure 3:
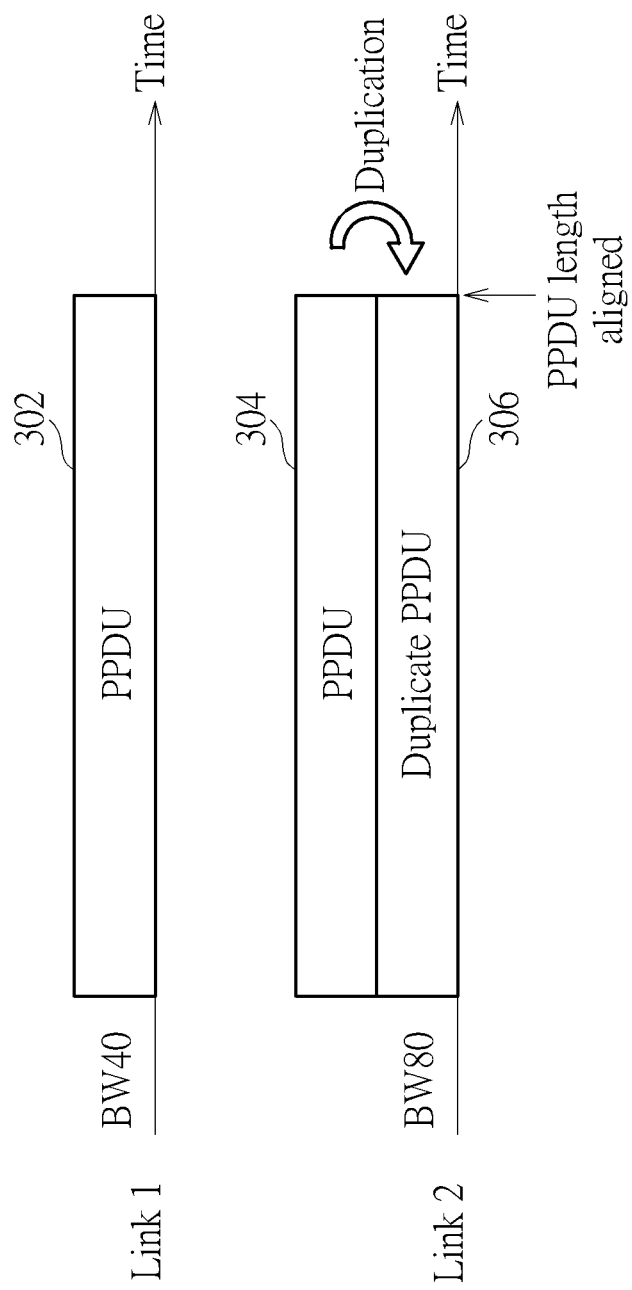
FIG. 3 is a diagram illustrating a second PPDU ending time alignment mechanism according to an embodiment of the present invention.

FIG. 3 is a diagram illustrating a second PPDU ending time alignment mechanism according to an embodiment of the present invention. In accordance with the second PPDU ending time alignment mechanism, one WiFi MLD (e.g., AP 102 shown in FIG. 1) aligns parameters of a plurality of links (e.g., links $L_{11}$-$L_{1N}$ or links $L_{21}$-$L_{2M}$ for constraining the links to have the same capacity for PPDU transmission, and transmits PPDUs via the links, where highest capacity supported by one of the links is different from highest capacity supported by another of the links, each of the PPDUs is generated and transmitted under the same parameters (which may include BW, NSS, and MCS), and more than one PPDU is transmitted via one link that supports higher capacity. For example, one WiFi MLD (e.g., AP 102) communicates with another WiFi MLD (e.g., non-AP STA 104 or non-AP STA 106) via a first link (denoted by "Link 1") and a second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link.

In accordance with the second PPDU ending time alignment mechanism, the PPDU transmission for each of the first link and the second link may use BW=40 MHz, NSS=1, and best MCS=MCS3. The second PPDU ending time alignment mechanism may be applicable to the duplicate transmission scenario with synchronized PPDU starting time. As shown in FIG. 3, one PPDU 302 is transmitted via the first link, and one PPDU 304 and one duplicate PPDU 306 (which is a duplicate of PPDU 304) are transmitted via the second link. In this embodiment, the WiFi MLD (e.g., AP 102) transmits the PPDUs 302, 304, and 306 to the same user (e.g., non-AP STA 104 or non-AP STA 106), and the PPDU 304 is a duplicate of the PPDU 302 such that the PPDUs 302, 304, and 306 carry the same content. As shown in FIG. 3, the ending time instants of transmission of PPDUs 302, 304, and 306 are aligned. Duplicated transmission in extra BW of a high capacity link (e.g., second link) further increases transmission robustness. In addition, extra signaling about the duplicate PPDU in the extra BW of the high capacity link (e.g., second link) may be required.

Figure 4:
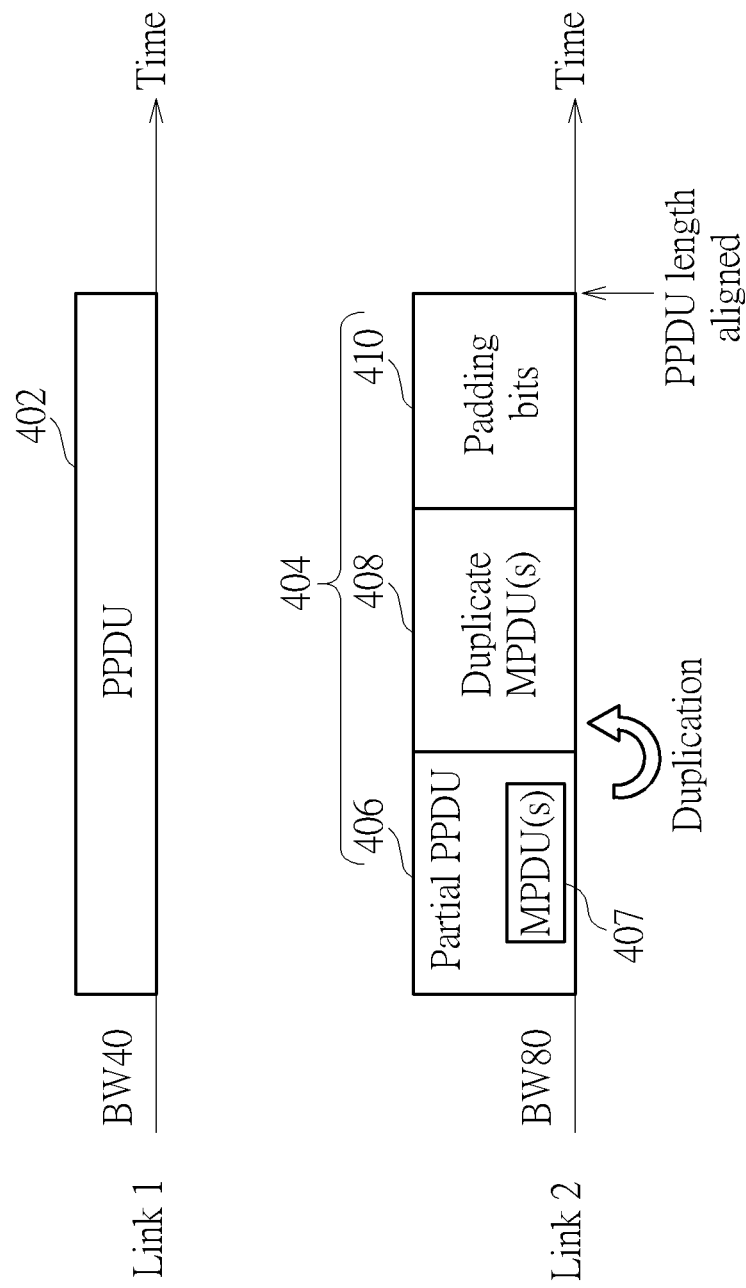
FIG. 4 is a diagram illustrating a third PPDU ending time alignment mechanism according to an embodiment of the present invention.

FIG. 4 is a diagram illustrating a third PPDU ending time alignment mechanism according to an embodiment of the present invention. In accordance with the third PPDU ending time alignment mechanism, one WiFi MLD (e.g., AP 102 shown in FIG. 1) sets parameters of each of links for enabling the links to have different capacity for PPDU transmission, sets a content that is carried by a first PPDU transmitted via one of the links to ensure that an ending time instant of transmission of the first PPDU transmitted via one of the links and an ending time instant of transmission of a second PPDU transmitted via another of the links are aligned, and transmits PPDUs (which include the first PPDU and the second PPDU) via the links. Parameters of each link may include BW, NSS, and MCS. In this embodiment, parameters of one of the links are different from parameters of another of the links, highest capacity supported by one of the links is higher than highest capacity supported by another of the links, and one PPDU is transmitted via each of the links. Each link may use its best parameters to generate and transmit the PPDU. For example, one WiFi MLD (e.g., AP 102) communicates with another WiFi MLD (e.g., non-AP STA 104 or non-AP STA 106 shown in FIG. 1) via a first link (denoted by "Link 1") and a second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link. The first link is configured to use best parameters, including BW=40 MHz, NSS=1, and best MCS=MCS3, for PPDU transmission, and the second link is configured to use best parameters, including BW=80 MHz, NSS=1, and best MCS=MCS7, for PPDU transmission.

Since the capacity provided by the second link is higher than the capacity provided by the first link, partial duplication can be enabled to align PPDU lengths for achieving PPDU ending time alignment. The third PPDU ending time alignment mechanism may be applicable to all of the aforementioned scenarios. As shown in FIG. 4, one PPDU 402 is transmitted via the first link, and one PPDU 404 is transmitted via the second link, where the WiFi MLD (e.g., AP 102) transmits PPDUs 402 and 404 to the same user (e.g., non-AP STA 104 or non-AP STA 106), and the PPDU 404 transmitted via the second link includes a partial PPDU 406 (which includes one or more media access control protocol data units (MPDUs) 407), one or more duplicate MPDUs 408, and optional padding bits 410. The duplicate MPDU(s) 408 may be derived from duplication of MPDU(s) 407, and one or more duplicate MPDUs may be obtained from the same source MPDU. The optional padding bits 410 may be set by 0's. In this embodiment, the duplicate MPDU(s) 408 are appended to the partial PPDU 406, and the optional padding bits 410 are appended to the duplicate MPDU(s) 408. In an alternative design, source MPDU(s) 407 and duplicate MPDU(s) 408 may be interleaved in the PPDU 404 to increase diversity. As shown in FIG. 4, the ending time instants of transmission of PPDUs 402 and 404 are aligned. Signaling of MPDU duplication may be required, and MPDUs with the same content can be decoded individually or jointly to reduce error possibility. It should be noted that PPDU starting time alignment is not necessarily required by the third PPDU ending time alignment mechanism.

Figure 5:
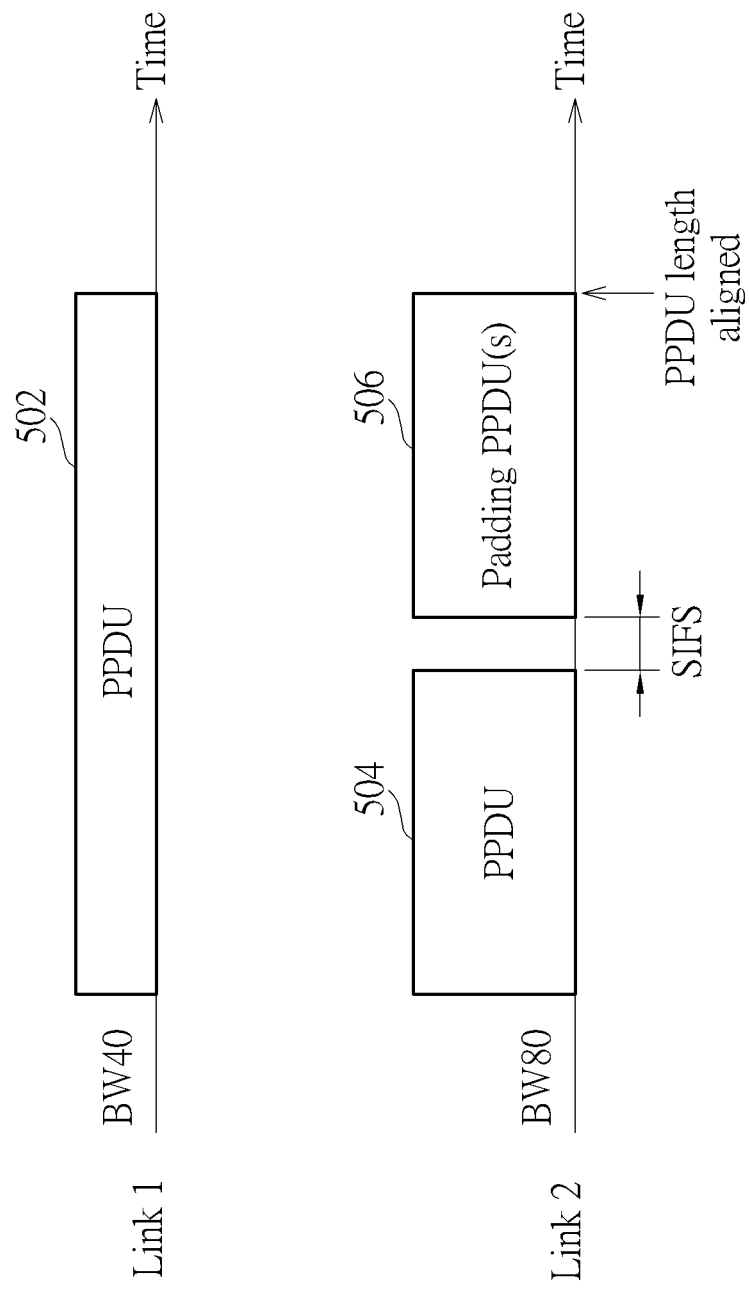
FIG. 5 is a diagram illustrating a fourth PPDU ending time alignment mechanism according to an embodiment of the present invention.

FIG. 5 is a diagram illustrating a fourth PPDU ending time alignment mechanism according to an embodiment of the present invention. In accordance with the fourth PPDU ending time alignment mechanism, one WiFi MLD (e.g., AP 102 shown in FIG. 1) sets parameters of links for enabling the links to have different capacity for PPDU transmission, and transmits PPDUs via the links. Parameters of each link may include BW, NSS, and MCS. In this embodiment, parameters of one of the links are different from parameters of another of the links, highest capacity supported by one of the links is higher than highest capacity supported by another of the links, one PPDU is transmitted via one link, and multiple PPDUs are transmitted via another link to ensure that an ending time instant of transmission of one PPDU on one link and an ending time instant of transmission of multiple PPDUs on another link are aligned.

Each link may use its best parameters to generate and transmit the PPDU. For example, one WiFi MLD (e.g., AP 102) communicates with another WiFi MLD (e.g., non-AP STA 104) via multiple links including a first link (denoted by "Link 1") and a second link (denoted by "Link 2"), and further communicates with yet another WiFi MLD (e.g., non-AP STA 106) via multiple links including the second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link. The first link is configured to use best parameters, including BW=40 MHz, NSS=1, and best MCS=MCS3, for PPDU transmission, and the second link is configured to use best parameters, including BW=80 MHz, NSS=1, and best MCS=MCS7, for PPDU transmission.

Since the capacity provided by the second link is higher than the capacity provided by the first link, the second link is allowed to transmit multiple PPDUs during a transmission period of one PPDU that is transmitted via the first link. The fourth PPDU ending time alignment mechanism may be applicable to all of the aforementioned scenarios. As shown in FIG. 5, one PPDU 502 is transmitted via the first link, and one PPDU 504 and at least one padding PPDU 506 are transmitted via the second link, where the WiFi MLD (e.g., AP 102) transmits the PPDUs 502 and 504 to the same user (e.g., non-AP STA 104), and transmits padding PPDU(s) 506 to a different user (e.g., non-AP STA 106). The multiple PPDUs 504 and 506 transmitted via the second link are separated by SIFS to ensure medium occupation. As shown in FIG. 5, an ending time instant of transmission of PPDU 502 and an ending time instant of transmission of multiple PPDUs 504 and 506 (particularly, an ending time instant of transmission of the last one of PPDUs 504 and 506) are aligned. It should be noted that PPDU starting time alignment is not necessarily required by the fourth PPDU ending time alignment mechanism.

In a case where the fourth PPDU ending time alignment mechanism is applied to the duplicate transmission scenario, the PPDU 504 is a duplicate of the PPDU 502, and an ending time instant of transmission of the PPDU 504 is earlier than an ending time instant of transmission of the PPDU 502. If immediate acknowledgement (ACK) is required by duplicate transmission and an ACK message is sent over the second link, the ACK message receiving interferes with transmission of padding PPDU(s) 506. To address this issue, the present invention proposes sending the ACK message over the first link that occupies the longer period to avoid interfering with transmission of the padding PPDU(s) 506 on the second link. Alternatively, a block ACK mechanism may be adopted to collect acknowledgement later after the transmission, and/or signaling can be adopted to delay the acknowledgement until the end of transmission.

Figure 6:
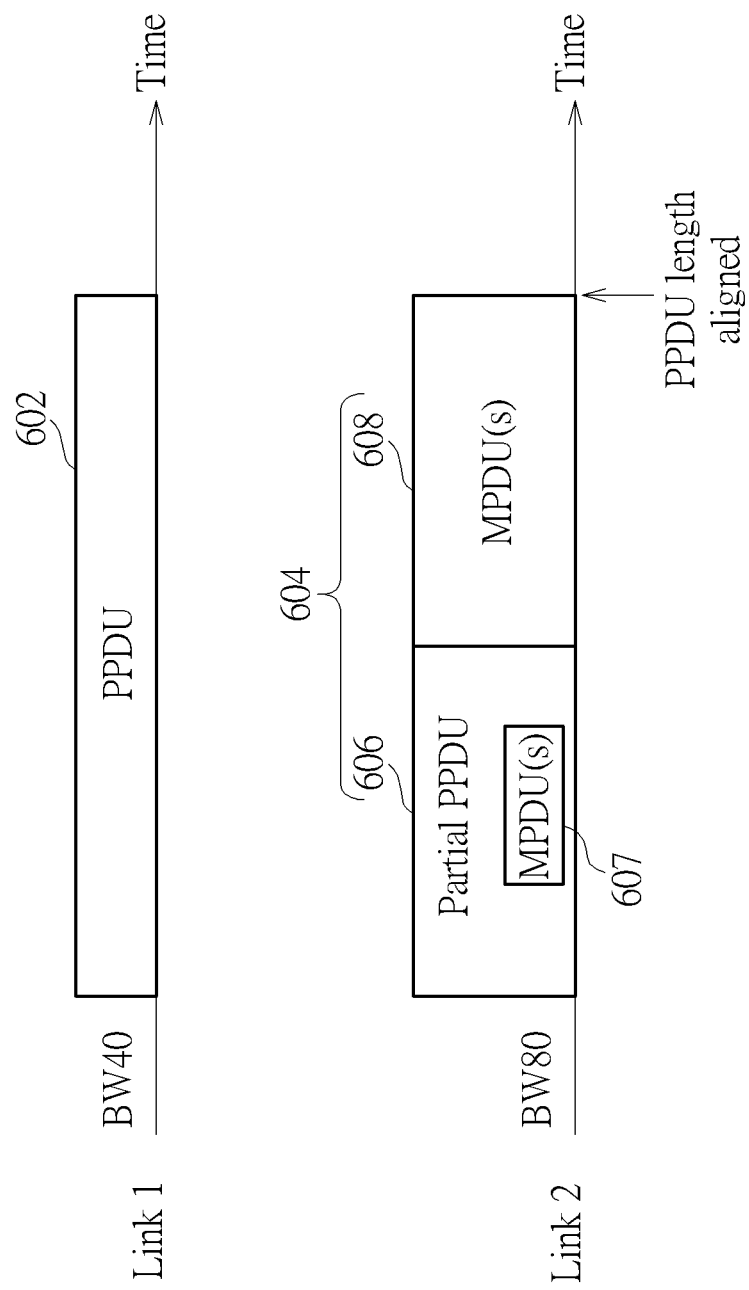
FIG. 6 is a diagram illustrating a fifth PPDU ending time alignment mechanism according to an embodiment of the present invention.

FIG. 6 is a diagram illustrating a fifth PPDU ending time alignment mechanism according to an embodiment of the present invention. In accordance with the fifth PPDU ending time alignment mechanism, one WiFi MLD (e.g., AP 102 shown in FIG. 1) sets parameters of links for enabling the links to have different capacity for PPDU transmission, sets a content that is carried by a first PPDU transmitted via one of the links to ensure that an ending time instant of transmission of the first PPDU transmitted via one of the links and an ending time instant of transmission of a second PPDU transmitted via another of the links are aligned, and transmits PPDUs (which include the first PPDU and the second PPDU) via the links. Parameters of each link may include BW, NSS, and MCS. In this embodiment, parameters of one of the links are different from parameters of another of the links, highest capacity supported by one of the links is higher than highest capacity supported by another of the links, and one PPDU is transmitted via each of the links. Each link may use its best parameters to generate and transmit PPDU. For example, one WiFi MLD (e.g., AP 102) communicates with another WiFi MLD (e.g., non-AP STA 104 or non-AP STA 106) via a first link (denoted by "Link 1") and a second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link. The first link is configured to use best parameters, including BW=40 MHz, NSS=1, and best MCS=MCS3, for PPDU transmission, and the second link is configured to use best parameters, including BW=80 MHz, NSS=1, and best MCS=MCS7, for PPDU transmission.

Since the capacity provided by the second link is higher than the capacity provided by the first link, different MPDUs can be allowed in the second link to align the PPDU lengths for achieving PPDU ending time alignment. The fifth PPDU ending time alignment mechanism may be applicable to the duplication transmission scenario with no PPDU starting time alignment. As shown in FIG. 6, one PPDU 602 is transmitted via the first link, and one PPDU 604 is transmitted via the second link, where the WiFi MLD (e.g., AP 102) transmits PPDUs 602 and 604 to the same user (e.g., non-AP STA 104 or non-AP STA 106), and the PPDU 604 transmitted via the second link includes a partial PPDU 606 (which includes one or more media access control protocol data units (MPDUs) 607), and one or more other MPDUs 608 that are not duplicate(s) of MPDU(s) 607. The MPDU(s) 608 are appended to the partial PPDU 606. As shown in FIG. 6, an ending time instant of transmission of PPDU 602 and an ending time instant of transmission of PPDU 604 are aligned. The partial PPDU 606 may be a duplicate of the PPDU 602. Hence, the MPDU(s) 608 carried in the second link are different from the MPDU(s) carried in the first link. In some embodiments of the present invention, the PPDU 604 may include optional padding bits (not shown) that are appended to the MPDU(s) 608 to make the PPDU length aligned.

Figure 7:
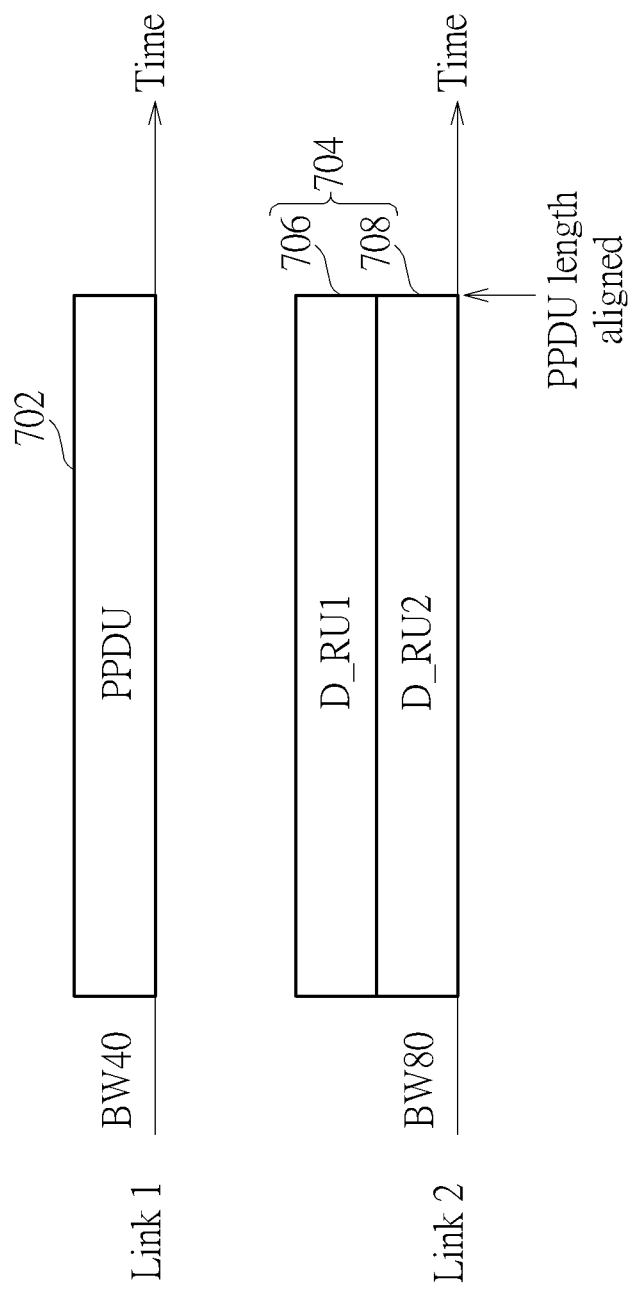
FIG. 7 is a diagram illustrating a sixth PPDU ending time alignment mechanism according to an embodiment of the present invention.

FIG. 7 is a diagram illustrating a sixth PPDU ending time alignment mechanism according to an embodiment of the present invention. In accordance with the sixth PPDU ending time alignment mechanism, one WiFi MLD (e.g., AP 102 shown in FIG. 1) sets parameters of links for enabling the links to have different capacity for PPDU transmission, sets a content that is carried by a first PPDU transmitted via one of the links to ensure that an ending time instant of transmission of the first PPDU transmitted via one of the links and an ending time instant of transmission of a second PPDU transmitted via another of the links are aligned, and transmits PPDUs (which include the first PPDU and the second PPDU) via the links. Parameters of each link may include BW, NSS, and MCS. In this embodiment, parameters of one of the links are different from parameters of another of the links, highest capacity supported by one of the links is higher than highest capacity supported by another of the links, and one PPDU is transmitted via each of the links. Each link may use its best parameters to generate and transmit the PPDU. For example, one WiFi MLD (e.g., AP 102) communicates with another WiFi MLD (e.g., non-AP STA 104) via multiple links including a first link (denoted by "Link 1") and a second link (denoted by "Link 2"), and communicates with yet another WiFi MLD (e.g., non-AP STA 106) via multiple links including the second link (denoted by "Link 2"), where the first link supports BW=40 MHz (denoted by "BW40"), NSS=1, and best MCS=MCS3, and the second link supports BW=80 MHz (denoted by "BW80"), NSS=1, and best MCS=MCS7. Hence, the highest capacity supported by the second link is higher than the highest capacity supported by the first link. The first link is configured to use best parameters, including BW=40 MHz, NSS=1, and best MCS=MCS3, for PPDU transmission, and the second link is configured to use best parameters, including BW=80 MHz, NSS=1, and best MCS=MCS7, for PPDU transmission.

Since the capacity provided by the second link is higher than the capacity provided by the first link, the second link can transmit a multi-user (MU) PPDU under a condition that the PPDU ending time alignment is met. The sixth PPDU ending time alignment mechanism may be applicable to all of the aforementioned scenarios. As shown in FIG. 7, one PPDU 702 is transmitted via the first link, and one MU PPDU 704 is transmitted via the second link. The MU PPDU 704 accommodates data of different users (e.g., different WiFi MLDs) in a plurality of resource units (RUs), where each RU is a group of subcarriers (tones). For example, the MU PPDU 704 carries user data D_RU1 in a first RU of the MU PPDU 704 and user data D_RU2 in a second RU of the MU PPDU 704, where the user data D_RU1 is transmitted to one user (e.g., non-AP STA 104), and the user data D_RU2 is transmitted to another user (e.g., non-AP STA 106). As shown in FIG. 7, an ending time instant of transmission of PPDU 702 and an ending time instant of transmission of MU PPDU 704 are aligned. In some embodiments of the present invention, the PPDU 702 and the user data D_RU1 included in the MU PPDU 704 may be transmitted to the same user (e.g., non-AP STA 104 or non-AP STA 106). In addition, padding in RUs for multiple users may be required. It should be noted that PPDU starting time alignment is not necessarily required by the sixth PPDU ending time alignment mechanism.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A physical protocol data unit (PPDU) transmission method comprising:
aligning, by a wireless fidelity (WiFi) multi-link device (MLD), parameters of a plurality of links for constraining the plurality of links to have same capacity for PPDU transmission, wherein the parameters comprise bandwidth (BW), number of spatial streams (NSS), and modulation and coding mechanism (MCS), the plurality of links use a same setting of BW, a same setting of NSS, and a same setting of MCS, and highest capacity supported by one of the plurality of links is different from highest capacity supported by another of the plurality of links; and
transmitting PPDUs via the plurality of links, wherein each of the PPDUs is generated and transmitted under the same parameters, one of the PPDUs is transmitted via said one of the plurality of links, another of the PPDUs is transmitted via said another of the plurality of links, and an ending time instant of transmission of said one of the PPDUs is aligned with an ending time instant of transmission of said another of the PPDUs.

2. The PPDU transmission method of claim 1, wherein the highest capacity supported by said one of the plurality of links is higher than the highest capacity supported by said another of the plurality of links, the highest capacity supported by said another of the plurality of links is available under first parameters employed by said another of the plurality of links for PPDU transmission, and aligning the parameters of the plurality of links adopted by the WiFi MLD comprises:
setting second parameters employed by said one of the plurality of links for PPDU transmission by the first parameters.

3. The PPDU transmission method of claim 2, wherein transmitting the PPDUs via the plurality of links comprises:
transmitting one PPDU via said one of the plurality of links, wherein said one of the plurality of links has unused capacity during a transmission period of said one PPDU.

4. The PPDU transmission method of claim 2, wherein transmitting the PPDUs via the plurality of links comprises:
transmitting one PPDU and one duplicate PPDU via said one of the plurality of links, wherein said one PPDU and said one duplicate PPDU carry a same content.

5. The PPDU transmission method of claim 1, wherein transmitting the PPDUs via the plurality of links comprises:
transmitting a first PPDU via said one of the plurality of links; and
transmitting a second PPDU via said another of the plurality of links;
wherein the first PPDU and the second PPDU carry a same content.

6. The PPDU transmission method of claim 1, wherein the PPDUs are transmitted to a same user only.

7. A wireless fidelity (WiFi) multi-link device (MLD), arranged to perform operations comprising:
aligning parameters of a plurality of links for constraining the plurality of links to have same capacity for physical protocol data unit (PPDU) transmission, wherein the parameters comprise bandwidth (BW), number of spatial streams (NSS), and modulation and coding mechanism (MCS), the plurality of links use a same setting of BW, a same setting of NSS, and a same setting of MCS, and highest capacity supported by one of the plurality of links is different from highest capacity supported by another of the plurality of links; and
transmitting PPDUs via the plurality of links, wherein each of the PPDUs is generated and transmitted under the same parameters, one of the PPDUs is transmitted via said one of the plurality of links, another of the PPDUs is transmitted via said another of the plurality of links, and an ending time instant of transmission of said one of the PPDUs is aligned with an ending time instant of transmission of said another of the PPDUs.

8. The WiFi MLD of claim 7, wherein the highest capacity supported by said one of the plurality of links is higher than the highest capacity supported by said another of the plurality of links, the highest capacity supported by said another of the plurality of links is available under first parameters employed by said another of the plurality of links for PPDU transmission, and aligning the parameters of the plurality of links adopted by the WiFi MLD comprises:
setting second parameters employed by said one of the plurality of links for PPDU transmission by the first parameters.

9. The WiFi MLD of claim 8, wherein transmitting the PPDUs via the plurality of links comprises:
transmitting one PPDU via said one of the plurality of links, wherein said one of the plurality of links has unused capacity during a transmission period of said one PPDU.

10. The WiFi MLD of claim 8, wherein transmitting the PPDUs via the plurality of links comprises:
transmitting one PPDU and one duplicate PPDU via said one of the plurality of links, wherein said one PPDU and said one duplicate PPDU carry a same content.

11. The WiFi MLD of claim 7, wherein transmitting the PPDUs via the plurality of links comprises:
transmitting a first PPDU via said one of the plurality of links; and
transmitting a second PPDU via said another of the plurality of links;
wherein the first PPDU and the second PPDU carry a same content.

12. The WiFi MLD of claim 7, wherein the PPDUs are transmitted to a same user only.

* * * * *